United States Patent [19]
Wilkinson et al.

[11] Patent Number: 5,828,894
[45] Date of Patent: Oct. 27, 1998

[54] ARRAY PROCESSOR HAVING GROUPING OF SIMD PICKETS

[75] Inventors: Paul Amba Wilkinson, Apalachin; James Warren Dieffenderfer, Owego; Peter Michael Kogge, Endicott, all of N.Y.

[73] Assignee: International Business Machines Corporation, Armonk, N.Y.

[21] Appl. No.: 723,370

[22] Filed: Sep. 30, 1996

Related U.S. Application Data

[63] Continuation of Ser. No. 431,617, May 1, 1995, which is a continuation of Ser. No. 887,455, May 22, 1992, which is a continuation-in-part of Ser. No. 611,594, Nov. 13, 1990, abandoned, and Ser. No. 798,788, Nov. 27, 1991, abandoned.

[51] Int. Cl.$^6$ .................................................. G06F 15/16
[52] U.S. Cl. ................................ 395/800.2; 395/800.13; 395/800.14
[58] Field of Search ................................ 395/800, 800.2, 395/800.13, 800.14

[56] References Cited

U.S. PATENT DOCUMENTS

| | | | |
|---|---|---|---|
| 3,537,074 | 10/1970 | Stokes et al. | 340/172 |
| 3,544,973 | 12/1970 | Borck et al. | 340/172.5 |
| 3,970,993 | 7/1976 | Finnila | 340/172.5 |

(List continued on next page.)

FOREIGN PATENT DOCUMENTS

| | | |
|---|---|---|
| 0132926 | 2/1985 | European Pat. Off. . |
| 0208497 | 6/1986 | European Pat. Off. . |
| 208457A2 | 6/1986 | European Pat. Off. . |
| 340668A2 | 4/1989 | European Pat. Off. . |
| 428327A1 | 11/1990 | European Pat. Off. . |
| 429733A2 | 6/1991 | European Pat. Off. . |
| 460599A3 | 12/1991 | European Pat. Off. . |
| 485690A2 | 5/1992 | European Pat. Off. . |
| 493876A2 | 7/1992 | European Pat. Off. . |
| 2223867 | 4/1990 | United Kingdom . |
| 89/09967 | 4/1988 | WIPO . |
| 92/06436 | 4/1992 | WIPO . |

OTHER PUBLICATIONS

Siegel et al., "Using the Multistage . . . in Parallel Super-computers," IEEE, 1989, pp. 1932–1953.

Bronson et al., "Experimental Analysis . . . on the Pasm Parallel Processing System," IEEE, 1989, pp. 2540–2543.

T.A. Kriz and M.J. Marple, "Multi–Port Bus Structure With Fast Shared Memory", IBM Technical Disclosure Bulletin, vol. 27, no.10A, pp. 5579–5580, Mar. 1985.

H.P. Bakoglu, "Second–Level Shared Cache Implementation For Multiprocessor Computers With A Common Interface For The Second–Level Shared Cache And The Second–Level Private Cache", IBM Technical Disclosure Bulletin, vol. 33, No. 11, pp. 362–365, Apr. 1991.

(List continued on next page.)

Primary Examiner—John E. Harrity
Assistant Examiner—John Follansbee
Attorney, Agent, or Firm—Lynn Augspurger, Esq.; Morgan & Finnegan, LLP

[57] ABSTRACT

Array processors are made by assembling individual microcomputer elements into an array. Larger arrays are called massively parallel processors. Some can operate in SIMD, while others can operate in MIMD, or SIMD and MIMD in special configurations. In a SIMD array of processors, there is a need to partition the processors into groups related to the type of problem they contain. When the grouping is the result of a computation within the processing element, it is desirable that each processing element be capable of assigning itself to a group, or maybe several groups. This disclosure describes a means of assigning processing elements to groups as an array function conducted in parallel by all active processing elements in the array, and then using grouping to select certain processing elements for a computation that is unique to the group.

26 Claims, 2 Drawing Sheets

U.S. PATENT DOCUMENTS

| | | | |
|---|---|---|---|
| 4,101,960 | 7/1978 | Stokes et al. | 364/200 |
| 4,107,773 | 8/1978 | Gilbreath et al. | 364/200 |
| 4,270,170 | 5/1981 | Reddaway | 364/200 |
| 4,314,349 | 2/1982 | Batcher | 364/716 |
| 4,338,675 | 7/1982 | Palmer et al. | 364/748 |
| 4,380,046 | 4/1983 | Fung | 364/200 |
| 4,394,726 | 7/1983 | Kohl | 364/200 |
| 4,412,303 | 10/1983 | Barnes et al. | 364/900 |
| 4,435,758 | 3/1984 | Lorie et al. | 364/200 |
| 4,467,422 | 8/1984 | Hunt | 364/200 |
| 4,468,727 | 8/1984 | Carrison | 364/200 |
| 4,498,133 | 2/1985 | Bolton et al. | 364/200 |
| 4,523,273 | 6/1985 | Adams, III et al. | 364/200 |
| 4,598,400 | 7/1986 | Hillis | 370/60 |
| 4,604,695 | 8/1986 | Widen et al. | 364/200 |
| 4,621,339 | 11/1986 | Wagner et al. | 364/200 |
| 4,622,650 | 11/1986 | Kulisch | 364/748 |
| 4,706,191 | 11/1987 | Hamstra et al. | 364/200 |
| 4,720,780 | 1/1988 | Dolecek | 364/200 |
| 4,736,291 | 4/1988 | Jennings et al. | 364/200 |
| 4,739,474 | 4/1988 | Holsztynski | 364/200 |
| 4,739,476 | 4/1988 | Fiduccia | 364/200 |
| 4,748,585 | 5/1988 | Chiarulli et al. | 364/900 |
| 4,763,321 | 8/1988 | Calvignac et al. | 370/94 |
| 4,780,873 | 10/1988 | Mattheyses | 370/94 |
| 4,783,738 | 11/1988 | Li et al. | 364/200 |
| 4,783,782 | 11/1988 | Morton | 371/11 |
| 4,805,091 | 2/1989 | Thiel et al. | 364/200 |
| 4,809,159 | 2/1989 | Sowa | 364/200 |
| 4,809,169 | 2/1989 | Sfarti et al. | 364/200 |
| 4,809,347 | 2/1989 | Nash et al. | 382/49 |
| 4,814,980 | 3/1989 | Peterson et al. | 364/200 |
| 4,825,359 | 4/1989 | Ohkami et al. | 364/200 |
| 4,831,519 | 5/1989 | Morton | 364/200 |
| 4,835,729 | 5/1989 | Morton | 364/200 |
| 4,841,476 | 6/1989 | Mitchell et al. | 364/900 |
| 4,847,755 | 7/1989 | Morrison et al. | 364/200 |
| 4,849,882 | 7/1989 | Aoyama et al. | 364/200 |
| 4,852,048 | 7/1989 | Morton | 364/200 |
| 4,855,903 | 8/1989 | Carleton et al. | 364/200 |
| 4,858,110 | 8/1989 | Miyata | 364/200 |
| 4,860,201 | 8/1989 | Stolfo et al. | 364/200 |
| 4,872,133 | 10/1989 | Leeland | 364/748 |
| 4,873,626 | 10/1989 | Gifford | 364/200 |
| 4,891,787 | 1/1990 | Gifford | 364/900 |
| 4,896,265 | 1/1990 | Fiduccia et al. | 364/200 |
| 4,901,224 | 2/1990 | Ewert | 364/200 |
| 4,903,260 | 2/1990 | Boettle et al. | 370/60 |
| 4,905,143 | 2/1990 | Takahashi et al. | 364/200 |
| 4,907,148 | 3/1990 | Morton | 364/200 |
| 4,910,665 | 3/1990 | Mattheyses et al. | 364/200 |
| 4,916,652 | 4/1990 | Schwarz | 364/748 |
| 4,916,657 | 4/1990 | Morton | 364/900 |
| 4,920,484 | 4/1990 | Ranade | 364/200 |
| 4,922,408 | 5/1990 | Davis et al. | 364/200 |
| 4,925,311 | 5/1990 | Neches et al. | 364/200 |
| 4,933,846 | 6/1990 | Humphrey et al. | 364/200 |
| 4,933,895 | 6/1990 | Grinberg et al. | 364/748 |
| 4,942,516 | 7/1990 | Hyatt | 364/200 |
| 4,942,517 | 7/1990 | Cok | 364/200 |
| 4,943,912 | 7/1990 | Aoyama et al. | 364/200 |
| 4,956,772 | 9/1990 | Neches | 364/200 |
| 4,958,273 | 9/1990 | Anderson et al. | 364/200 |
| 4,964,032 | 10/1990 | Smith | 364/200 |
| 4,967,340 | 10/1990 | Dawes | 364/200 |
| 4,975,834 | 12/1990 | Xu et al. | 364/200 |
| 4,985,832 | 1/1991 | Grondalski | 364/200 |
| 4,992,926 | 2/1991 | Janke et al. | 364/134 |
| 4,992,933 | 2/1991 | Taylor | 364/200 |
| 5,005,120 | 4/1991 | Ruetz | 364/200 |
| 5,006,978 | 4/1991 | Neches | 364/200 |
| 5,008,815 | 4/1991 | Hillis | 364/200 |
| 5,008,882 | 4/1991 | Peterson et al. | 370/94.3 |
| 5,010,477 | 4/1991 | Omoda et al. | 364/200 |
| 5,016,163 | 5/1991 | Jesshope et al. | 364/200 |
| 5,020,059 | 5/1991 | Gorin et al. | 371/11.3 |
| 5,021,945 | 6/1991 | Morrison et al. | 364/200 |
| 5,038,282 | 8/1991 | Gilbert et al. | 364/200 |
| 5,038,386 | 8/1991 | Li | 382/49 |
| 5,041,189 | 8/1991 | Tamitani | 364/200 |
| 5,041,971 | 8/1991 | Carvey et al. | 364/200 |
| 5,045,995 | 9/1991 | Levinthal | 364/200 |
| 5,047,917 | 9/1991 | Athas et al. | 364/200 |
| 5,049,982 | 9/1991 | Lee et al. | 357/81 |
| 5,056,000 | 10/1991 | Chang | 364/200 |
| 5,072,217 | 12/1991 | Georgiou et al. | 340/825.79 |
| 5,113,523 | 5/1992 | Colley et al. | 395/800 |
| 5,121,498 | 6/1992 | Gilbert et al. | 395/700 |
| 5,136,582 | 8/1992 | Firoozmand | 370/85.1 |
| 5,142,540 | 8/1992 | Glasser | 371/40.1 |
| 5,146,608 | 9/1992 | Hillis | 395/800 |
| 5,165,023 | 11/1992 | Gifford | 395/325 |
| 5,170,482 | 12/1992 | Shu et al. | 395/800 |
| 5,170,484 | 12/1992 | Gorodalski | 395/800 |
| 5,173,947 | 12/1992 | Chande et al. | 382/41 |
| 5,175,862 | 12/1992 | Phelps et al. | 395/800 |
| 5,175,865 | 12/1992 | Hillis | 395/800 |
| 5,181,017 | 1/1993 | Frey, Jr. et al. | 340/825.02 |
| 5,187,801 | 2/1993 | Zenois et al. | 395/800 |
| 5,189,665 | 2/1993 | Niehaus et al. | 370/458.1 |
| 5,197,130 | 3/1993 | Chen et al. | 395/325 |
| 5,212,773 | 5/1993 | Hillis | 395/200 |
| 5,212,777 | 5/1993 | Gove et al. | 395/375 |
| 5,218,676 | 6/1993 | Ben-Ayed et al. | 395/200 |
| 5,218,709 | 6/1993 | Fijany et al. | 395/800 |
| 5,230,079 | 7/1993 | Grondalski | 395/800 |
| 5,239,629 | 8/1993 | Miller et al. | 395/325 |
| 5,239,654 | 8/1993 | Ing-Simmons et al. | 395/800 |
| 5,251,097 | 10/1993 | Simmons et al. | 361/687 |
| 5,253,359 | 10/1993 | Spix et al. | 395/575 |
| 5,265,124 | 11/1993 | Staab et al. | 375/3 |
| 5,280,474 | 1/1994 | Nickolls et al. | 370/60 |
| 5,297,260 | 3/1994 | Kametani | 395/325 |
| 5,355,508 | 10/1994 | Kan | 395/800 |
| 5,367,636 | 11/1994 | Colley et al. | 395/200 |
| 5,371,896 | 12/1994 | Gove et al. | 395/800.2 |
| 5,625,836 | 4/1997 | Barker et al. | 395/200.44 |

OTHER PUBLICATIONS

Mansingh et al., "System Level Air Flow Analysis for a Computer System Processing Unit", *Hewlett–Packard Journal*, vol. 41, No. 5, Oct. 1990, pp. 82–87.

Tewksbury et al., "Communication Network Issues and High–Density Interconnects in Large–Scale Distributed Computing Systems", *IEEE Journal on Selected Areas in Communication*, vol. 6 No. 3, Apr. 1988, pp. 587–607.

Boubekeur et al., "Configuring A Wafer–Scale Two–Dimensional Array of Single–Bit Processors", Computer, vol. 2, Issue 4, Apr. 1992, pp. 29–39.

Korpiharju et al., "TUTCA Configurable Logic Cell Array Architecture" IEEE, Sep. 1991, pp. 3–3.1 –3–3.4.

C.K. Baru and S.Y.W. Su, "The Architecture of SM3: A Dynamically Partitionable Multicomputer System", IEEE Transactions on Computers, vol. C–35, No. 9, pp. 790–802, Sep. 1986.

S.P. Booth et al., "An Evaluation of the Meiko Computing Surface for HEP Fortran Farming*", Computer Physics Communications 57, pp. 486–491, 1989.

S.P. Booth et al., "Large Scale Applications of Transputers in HEP: The Edinburgh Concurrent Supercomputer Project", Computer Physics Communications 57, pp. 101–107, 1989.

P. Christy, "Software to Support Massively Parallel Computing on the MasPar MP–1", 1990 IEEE, pp. 29–33.

S.R. Colley, "Parallel Solutions to Parallel Problems", Research & Development, pp. 42–45, Nov. 21, 1989.

J.R. Nickolls, "The Design of the MasPar MP–1: A Cost Effective Massively Parallel Computer", 1990 IEEE, pp. 25–28.

J.F. Prins and J.A. Smith, "Parallel Sorting of Large Arrays on the MasPar MP–1*, The 3rd Symposium on the Frontiers of Massively Parallel Computation", pp. 59–64, Oct., 1990.

J.B. Rosenberg and J.D. Becher, "Mapping Massive SIMD Parallelism onto Vector Architecture for Simulation", Software–Practice and Experience, vol. 19(8), pp. 739–756, Aug. 1989.

J.C. Tilton, "Porting an Interactive Parallel Region Growing Algorithm from the MPP to the MasPar MP–1", The 3rd Symposium on the Frontiers of Massively Parallel Computation, pp. 170–173, Oct., 1990.

"Sequent Computer Systems Balance and Symmery Series", Faulkner Technical Reports, Inc., pp. 1–6, Jan., 1988.

"Symmetry 2000/400 and 2000/700 with the DYNIX/ptx Operation System", Sequent Computer Systems Inc.

"Symmetry 2000 Systems—Foundation for Information Advantage", Sequent Computer Systems Inc.

"Our Customers Have Something That Gives Them an Unfair Advantage", The nCUBE Parallel Software Environment, nCUBE Corporation.

Y.M. Leung, "Parallel Technology Mapping With Identification of Cells for Dynamic Cell Generation", Dissertation, Syracuse University, May 1992.

"The Connection Machine CM–5 Technical Summary", Thinking Machines Corporation, Oct., 1991.

Finneberg et al., "Experimental Analysis of a Mixed–Mode Parallel Architecture using Bitonic Sequence Sorting", *Journal of Parallel And Distributed Computing*, Mar. 1991, pp. 239–251.

T. Bridges, "The GPA Machine: A Generally Partitionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D.A. Nicole, "Esprit Project 1085 Reconfigurable Transputer Processor Architecture", CONPAR 88 Additional Papers, Sep. 1988, pp. 12–39.

E. DeBenedictis and J.M. del Rosario, "nCUBE Parallel I/O Software", IPCCC '92, 1992 IEEE, pp. 0117–0124.

T.H. Dunigan, Hypercube Clock Synchronizatoin: Concurrency: Practice and Experience, vol. 4(3), pp. 257–268, May 1992.

T.H. Dunigan, "Performance of the Intel iPSC/860 and Ncube 6400 hypercubes*", Parallel Computing 17, pp. 1285–1302, 1991.

D.D. Gajski and J.K. Peir, "Essential Issues in Multiprocessor Systems", 1985 IEEE, pp. 9–27, Jun. 1985.

A. Holman, "The Meiko Computing Surface: A Parallel & Scalable Open Systems Platform for Oracle", A Study of a Parallel Database Machine and its Performance—The NCR/Teradata DBC/1012, pp. 96–114.

Baba et al., "A Parallel Object–Oriented Total Architecture: A NET", Proceedings Supercomputing, Nov. 1990, pp. 276–285.

Mitchell et al., "Architectural Description of a New, Easily Expandable Self–Routing Computer Network Topology", IEEE INFOCOM, Apr. 1989, pp. 981–988.

K. Padmanabhan, "Hierarchical Communication in Cube–Connected Multiprocessors", The 10th International Conference on Distributed Computing Systems, May 1990, pp. 270–277.

Fineberg et al., "Experimental Analysis of Communication/Data–Conditional Aspects of a Mixed–Mode Parallel Architecture via Synthetic Computations", *Proceedings Supercomputing '90*, Nov. 1990, pp. 647–646.

Kan et al., "Parallel Processing on the CAP: Cellular Array Processor", *COMPCON* 84, 16 Sep. 1984, pp. 239–244.

Ezzedine et al., "A 16–bit Specialized Processor Design", *Integration THE VLSI Journal*, vol. 6 No. 1, May 1988, pp. 101–110.

A. Mudrow, "High Speed Scientific Arithemetic Using a High Performance Sequencer", *ELECTRO*, vol. 6, No. 11, 1986, pp. 1–5.

Alleyne et al., "A Bit–Parallel, Word–Parallel, Massively Parallel Accociative Processor for Scientific Computing", *Third Symposium on the Frontiers of Massive Parallel Computation*, Oct. 8–10, 1990; pp. 176–185.

Jesshoppe et al., "Design of SIMD Microprocessor Array", *IEEE Proceedings*, vol. 136., May 1989, pp. 197–204.

DeGroot et al., "Image Processing Using the Print Multiprocesson", *IEEE*, 1989, pp. 173–176.

Nudd et al., "An Heterogeneous M–SIMD Architecture for Kalman Filter Controlled Processing of Image Sequences", *IEEE* 1992, pp. 842–845.

Li et al., "Polmorphic–Torus Network", IEEE Transactions on Computers, vol. 38, No. 9, Sep. 1989, pp. 1345–1351.

Li et al., "Sparse Matrix Vector Multiplication of Polymorphic–Torus", IBM Technical Disclosure Bulletin, vol. 32, No.3A, Aug. 1989, pp. 233–238.

Li et al., "Parallel Local Operator Engine and Fast P300", IBM Tech. Disc. Bulletin, vol. 32, No. 8B, Jan. 1990, pp. 295–300.

R. Duncan, "A Survey of Parallel Computer Architectures", IEEE, Feb. 90' pp. 5–16.

C.R. Jesshope et al., "Design of SIMD Microprocessor Array", UMI Article Clearing house, Nov. 88'.

Sener Ilgen & Issac Schers, "Parallel Processing on VLSI Associative Memory", NSF Award #ESC–8404627, pp. 50–53.

H. Stone, "Introduction to Computer Architecture", Science Research Associates, 1975, Ch. 8, pp. 318–374.

R. M. Lea, "WASP: A WSI Associative String Processor" Journal of VLSI Signal Processing, May 1991, No. 4, pp. 271–285.

Lea, R.M., "ASP Modules: Cost–Effective Building–Blocks for Real–Time DSP Systems", Journal of VLSI Signal Processing, vol. 1, No. 1, Aug. 1989, pp. 69–84.

Isaac D. Scherson, et al., "Bit Parallel Arithmetic in a Massively–Parallel Associative Processor", IEEE, Vo. 41, No. 10, Oct. 1992.

Supreet Singh and Jia–Yuan Han, "Systolic arrays", IEEE, Feb. 1991.

H. Richter and G. Raupp, "Control of a Tokamak Fusion Esperiment by a Set of Multitop Parallal Computers", IEEE vol. 39, 1992, pp. 192–197.

Higuchi et al., "IXM2: A Parallel Associative Processor for Semantic Net Processing—Preliminary Evaluation—", IEEE, Jun. 1990, pp. 667–673.

Frison et al. "Designing Specific Systolic Arrays with the API15C Chip", IEEE 1990, xii+808pp., pp. 505–517.

Berg et al., "Instruction Execution Trade–Offs for SIMD vs. MIMD vs. Mixed Mode Parallelism", IEEE Feb. 1991, pp. 301–308.

Raghaven et al., "Fine Grain Parallel Processors and Real–Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R.M. Lea, "ASP: A Cost–effective Parallel Microcomputer", IEEE Oct. 1988, pp. 10–29.

Mark A. Nichols, "Data Management and Control–Flow Constructs in a SIMD/SPMD Parallel Language/Compiler", IEEE, Feb. 1990, pp. 397–406.

Will R. Moore, "VLSI For Artificial Intelligence", Kluwer Academic Publishers, Ch. 4.1.

Mosher et al., "A Software Architecture for Image Processing on a Medium–Grain Parallel Machine", SPIE vol. 1659 Image Processing and Interchange, 1992/279.

*Patent Abstracts of Japan*, vol. 8, No. 105, 17 May 1984, p. 274. App. No. JP–820 125 341 (Tokyo Shibaura Denki KK) 27 Jan. 1984.

W.D. Hillis, "*The Connection Machine*", The MIT Press, Chapters 1, 3, and 4.

"Joho–syori", vol. 26(3), 1985–3, pp. 213–225, (Japanese).

ARRAY PROCESSOR HAVING GROUPING OF SIMD PICKETS

CROSS-REFERENCE TO OTHER CO-PENDING PATENT APPLICATIONS

This is a continuation of co-pending application Ser. No. 08/431,617, filed on May 1, 1995, which is a continuation of Ser. No. 07/887,455, filed on May 22, 1992, which is a continuation-in-part of the following related patent applications: U.S. patent application Ser. No. 07/611,594, filed Nov. 13, 1990, of J. Dieffenderfer et al., entitled "Parallel Associative Processor System", now abandoned; and U.S. patent application Ser. No. 07/798,788, filed Nov. 27, 1991, of P. M. Kogge, entitled "Dynamic Multi-Mode Parallel Processor Array Architecture", now abandoned.

In addition, this application is related to the following applications filed concurrently herewith:

U.S. patent application Ser. No. 07/887,718, filed May 22, 1992, of P. A. Wilkinson et al., entitled "Instructions within a SIMD Processing Element", now abandoned: and U.S. patent application Ser. No. 07/887,514, filed May 22, 1992, of P. A. Wilkinson et al., entitled "Floating Point Implementation on a SIMD Machine", now abandoned; and U.S. patent application Ser. No. 07/887,455, filed May 22, 1992, of P. A. Wilkinson et al., entitled "Grouping of SIMD Pickets", now abandoned; and U.S. patent application Ser. No. 07/887,456, filed May 22, 1992, of P. A. Wilkinson et al., entitled "Slide Network for an Array Processor", now abandoned; and U.S. patent application Ser. No. 07/887,256, filed May 22, 1992, of P. A. Wilkinson et al., entitled "Picket Autonomy on a SIMD Machine", now abandoned; and U.S. patent application Ser. No. 07/887,459, filed May 22, 1992, of R. R. Richardson et al., entitled "Controller Features for a SIMD/MIMD Machine", now abandoned; and U.S. patent application Ser. No. 07/887,997, filed May 22, 1992, of P. A. Wilkinson et al., entitled "Array Processor Communication Network Based on H-DOTS", now abandoned, Futher this application is related to:

U.S. patent application Ser. No. 07/887,630, filed May 22, 1992, of T. Barker, et al., entitled "Advanced Parallel Array Processor", now U.S. Pat. No. 5,590,345, and U.S. patent application Ser. No. 07/885,000, filed May 22, 1992, of T. Barker, et al., entitled "SIMD/MIMD Processing Memory Element", now abandoned; and U.S. patent application Ser. No. 07/887,262, filed May 22, 1992, of T. Barker, et al., entitled "PME Store and Forward/ Circuit Switched Modes", now abandoned; and U.S. patent application Ser. No. 07/887,508, filed May 22, 1992, of T. Barker, et al., entitled "Fully Distributed Processing Memory Element", now abandoned; and U.S. patent application Ser. No. 07/887,612, filed May 22, 1992, of M. Dapp, et al., entitled "Advanced Parallel Processor Array Director", now abandoned; and U.S. patent application Ser. No. 07/887,512, filed May 22, 1992, of M. Dapp, et al., entitled "APAP Mechanical Packaging", now abandoned; and U.S. patent application Ser. No. 07/888,684, filed May 22, 1992, of T. Barker, et al., entitled "N-Dimensional Modified Hypercube", now abandoned; and U.S. patent application Ser. No. 07/887,258, filed May 22, 1992, of M. Dapp, et al., entitled "APAP I/O Programmable Router", now abandoned; and U.S. patent application Ser. No. 07/887,259, filed May 22, 1992, of T. Barker, et al., entitled "APAP I/O Zipper Connection", now abandoned; and These co-pending applications and the present application are owned by one and the same assignee, International Business Machines Corporation of Armonk, N.Y.

The descriptions set forth in these co-pending applications are incorporated into the present application by reference.

CROSS REFERENCE TO OTHER CO-PENDING PATENT APPLICATIONS

Other commonly owned co-pending applications also assigned to the same assignee as the present application at the time of filing include:

U.S. patent application Ser. No. 07/250,595, filed Sep. 27, 1988, now abandoned in favor of its continuation application Ser. No. 07/519,332, filed May 4, 1990 of James L. Taylor entitled "SIMD Array Processor" (which was originally published as EPO Application Ser. No. 88307855/88-A on May 3, 1989, now U.S. Pat. No. 4,992,933); and U.S. patent application Ser. No. 07/193,990, filed May 13, 1988, of H. Li, entitled "Methods and Circuit for Implementing an Arbitrary Graph on a Polymorphic Mesh", now abandoned; and U.S. patent application Ser. No. 07/426,140, filed Oct. 24, 1989, of R. Jaffe et al entitled "Two-Dimensional Input/Output Scheme for Massively Parallel SIMD Computers", now abandoned; and U.S. patent application Ser. No. 07/439,758, filed Nov. 21, 1989, of W. C. Dietrich, Jr. et al entitled "Method and Apparatus for Performing Memory Protection Operations in a Parallel Processor System", now abandoned; and U.S. patent application Ser. No. 07/698,866, filed May 13, 1991, of David B. Rolfe, entitled "Method for Interconnecting and System of Interconnected Processing Elements", now U.S. Pat. No. 5,313,645.

All above referenced co-pending applications are also are owned by one and the same assignee, namely, International Business Machines Corporation of Armonk, N.Y.

The descriptions set forth in these co-pending applications are also incorporated by reference.

FIELD OF THE INVENTION

The invention relates to computers and computer systems, particularly to an array processor in which there are a plurality of pickets, and more particularly to a mechanism for grouping pickets in a SIMD/MIMD array for execution of programs by the array processor.

GLOSSARY OF TERMS

ALU

ALU is the arithmetic logic unit portion of a processor.

Array

Array refers to an arrangement of elements in one or more dimensions. An array can include an ordered set of data items (array element) which in languages like Fortran are identified by a single name. In other languages such a name of an ordered set of data items refers to an ordered collection or set of data elements, all of which have identical attributes. A program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations and when parallel can each independently and in parallel execute the operations required. Generally, arrays may be thought of as grids of processing elements. Sections of the array may be assigned sectional data, so that sectional data can be moved around in a regular grid pattern. However, data can be indexed or assigned to an arbitrary location in an array.

Array Director

An Array Director is a unit programmed as a controller for an array. It performs the function of a master controller for a grouping of functional elements arranged in an array.

Array Processor

There two principal types of array processors—multiple instruction multiple data (MIMD) and single instruction multiple data (SIMD). In a MIMD array processor, each processing element in the array executes its own unique instruction stream with its own data. In a SIMD array processor, each processing element in the array is restricted to the same instruction via a common instruction stream; however, the data associated with each processing element is unique. Our preferred array processor has other characteristics. We call it Advanced Parallel Array Processor, and use the acronym APAP.

Asynchronous

Asynchronous is without a regular time relationship; the execution of a function is unpredictable with respect to the execution of other functions which occur without a regular or predictable time relationship to other function executions. In control situations, a controller will address a location to which control is passed when data is waiting for an idle element being addressed. This permits operations to remain in a sequence while they are out of time coincidence with any event.

BOPS/GOPS

BOPS or GOPS are acronyms having the same meaning—billions of operations per second. See GOPS.

Circuit Switched/Store Forward

These terms refer to two mechanisms for moving data packets through a network of nodes. Store Forward is a mechanism whereby a data packet is received by each intermediate node, stored into its memory, and then forwarded on towards its destination. Circuit Switch is a mechanism whereby an intermediate node is commanded to logically connect its input port to an output port such that data packets can pass directly through the node towards their destination, without entering the intermediate node's memory.

Cluster

A cluster is a station (or functional unit) which consists of a control unit (cluster controller) and the hardware (which may be terminals, functional units, or virtual components) attached to it. Our Cluster includes an array of PMEs sometimes called a Node array. Usually a cluster has 512 PMEs.

Our Entire PME node array consists of a set of clusters, each cluster supported by a cluster controller (CC).

Cluster controller

A cluster controller is a device that controls input/output (I/O) operations for more than one device or functional unit connected to it. A cluster controller is usually controlled by a program stored and executed in the unit as it was in the IBM 3601 Finance Communication Controller, but it can be entirely controlled by hardware as it was in the IBM 3272 Control Unit.

Cluster synchronizer

A cluster synchronizer is a functional unit which manages the operations of all or part of a cluster to maintain synchronous operation of the elements so that the functional units maintain a particular time relationship with the execution of a program.

Controller

A controller is a device that directs the transmission of data and instructions over the links of an interconnection network; its operation is controlled by a program executed by a processor to which the controller is connected or by a program executed within the device.

CMOS

CMOS is an acronym for Complementary Metal-Oxide Semiconductor technology. It is commonly used to manufacture dynamic random access memories (DRAMs). NMOS is another technology used to manufacture DRAMS. We prefer CMOS but the technology used to manufacture the APAP is not intended to limit the scope of the semiconductor technology which is employed.

Dotting

Dotting refers to the joining of three or more leads by physically connecting them together. Most backpanel busses share this connection approach. The term relates to OR DOTS of times past but is used here to identify multiple data sources that can be combined onto a bus by a very simple protocol.

Our I/O zipper concept can be used to implement the concept that the port into a node could be driven by the port out of a node or by data coming from the system bus. Conversely, data being put out of a node would be available to both the input to another node and to the system bus. Note that outputting data to both the system bus and another node is not done simultaneously but in different cycles.

Dotting is used in the H-DOT discussions where Two-ported PEs or PMEs or Pickets can be used in arrays of various organizations by taking advantage of dotting. Several topologies are discussed including 2D and 3D Meshes, Base 2 N-cube, Sparse Base 4 N-cube, and Sparse Base 8 N-cube.

DRAM

DRAM is an acronym for dynamic random access memory, the common storage used by computers for main memory. However, the term DRAM can be applied to use as a cache or as a memory which is not the main memory.

FLOATING-POINT

A floating-point number is expressed in two parts. There is a fixed point or fraction part, and an exponent part to some assumed radix or Base. The exponent indicates the actual placement of the decimal point. In the typical floating-point representation a real number 0.0001234 is represented as 0.1234−3, where 0.1234 is the fixed-point part and −3 is the exponent. In this example, the floating-point radix or base is 10, where 10 represents the implicit fixed positive integer base, greater than unity, that is raised to the power explicitly denoted by the exponent in the floating-point representation or represented by the characteristic in the floating-point representation and then multiplied by the fixed-point part to determine the real number represented. Numeric literals can be expressed in floating-point notation as well as real numbers.

FLOPS

This terms refers to floating-point instructions per second. Floating-point operations include ADD, SUB, MPY, DIV and often many others. Floating-point instructions per second parameter is often calculated using the add or multiply instructions and, in general, may be considered to have a 50/50 mix. An operation includes the generation of exponent, fraction and any required fraction normalization. We could address 32 or 48-bit floating-point formats (or longer but we have not counted them in the mix.) A floating-point operation when implemented with fixed point instructions (normal or RISC) requires multiple instructions. Some use a 10 to 1 ratio in figuring performance while some specific studies have shown a ratio of 6.25 more appropriate to use. Various architectures will have different ratios.

Functional unit

A functional unit is an entity of hardware, software, or both, capable of accomplishing a purpose.

Gbytes

Gbytes refers to a billion bytes. Gbytes/s would be a billion bytes per second.

GIGAFLOPS $(10)^{**}9$ floating-point instructions per second.

GOPS and PETAOPS

GOPS or BOPS, have the same meaning—billions of operations per second. PETAOPS means trillions of operations per second, a potential of the current machine. For our APAP machine they are just about the same as BIPs/GIPs meaning billions of instructions per second. In some machines an instruction can cause two or more operations (ie. both an add and multiply) but we don't do that. Alternatively it could take many instructions to do an op. For example we use multiple instructions to perform 64 bit arithmetic. In counting ops however, we did not elect to count log ops. GOPS may be the preferred use to describe performance, but there is no consistency in usage that has been noted. One sees MIPs/MOPs then BIPs/BOPs and MegaFLOPS/GigaFLOPS/TeraFLOPS/PetaFlops.

ISA

ISA means the Instruction Set Architecture.

Link

A link is an element which may be physical or logical. A physical link is the physical connection for joining elements or units, while in computer programming a link is an instruction or address that passes control and parameters between separate portions of the program. In multisystems a link is the connection between two systems which may be specified by program code identifying the link which may be identified by a real or virtual address. Thus generally a link includes the physical medium, any protocol, and associated devices and programming; it is both logical and physical.

MFLOPS

MFLOPS means $(10)^{**}6$ floating-point instructions per second.

MIMD

MIMD is used to refer to a processor array architecture wherein each processor in the array has its own instruction stream, thus Multiple Instruction stream, to execute Multiple Data streams located one per processing element.

Module

A module is a program unit that is discrete and identifiable or a functional unit of hardware designed for use with other components. Also, a collection of PEs contained in a single electronic chip is called a module.

Node

Generally, a node is the junction of links. In a generic array of PEs, one PE can be a node. A node can also contain a collection of PEs called a module. In accordance with our invention a node is formed of an array of PMEs, and we refer to the set of PMEs as a node. Preferably a node is 8 PMEs.

Node array

A collection of modules made up of PMEs is sometimes referred to as a node array, is an array of nodes made up of modules. A node array is usually more than a few PMEs, but the term encompasses a plurality.

PDE

A PDE is a partial differential equation.

PDE relaxation solution process

PDE relaxation solution process is a way to solve a PDE (partial differential equation). Solving PDEs uses most of the super computing compute power in the known universe and can therefore be a good example of the relaxation process. There are many ways to solve the PDE equation and more than one of the numerical methods includes the relaxation process. For example, if a PDE is solved by finite element methods relaxation consumes the bulk of the computing time. Consider an example from the world of heat transfer. Given hot gas inside a chimney and a cold wind outside, how will the temperature gradient within the chimney bricks develop? By considering the bricks as tiny segments and writing an equation that says how heat flows between segments as a function of temperature differences then the heat transfer PDE has been converted into a finite element problem. If we then say all elements except those on the inside and outside are at room temperature while the boundary segments are at the hot gas and cold wind temperature, we have set up the problem to begin relaxation. The computer program then models time by updating the temperature variable in each segment based upon the amount of heat that flows into or out of the segment. It takes many cycles of processing all the segments in the model before the set of temperature variables across the chimney relaxes to represent actual temperature distribution that would occur in the physical chimney. If the objective was to model gas cooling in the chimney then the elements would have to extend to gas equations, and the boundary conditions on the inside would be linked to another finite element model, and the process continues. Note that the heat flow is dependent upon the temperature difference between the segment and its neighbors. It thus uses the inter-PE communication paths to distribute the temperature variables. It is this near neighbor communication pattern or characteristic that makes PDE relation very applicable to parallel computing.

PICKET

This is the element in an array of elements making up an array processor. It consists of: data flow (ALU REGS), memory, control, and the portion of the communication matrix associated with the element. The unit refers to a 1/nth of an array processor made up of parallel processor and memory elements with their control and portion of the array intercommunication mechanism. A picket is a form of processor memory element or PME. Our PME chip design processor logic can implement the picket logic described in related applications or have the logic for the array of processors formed as a node. The term PICKET is similar to the commonly used array term PE for processing element, and is an element of the processing array preferably comprised of a combined processing element and local memory for processing bit parallel bytes of information in a clock cycle. The preferred embodiment consisting of a byte wide data flow processor, 32k bytes or more of memory, primitive controls and ties to communications with other pickets.

The term "picket" comes from Tom Sawyer and his white fence, although it will also be understood functionally that a military picket line analogy fits quite well.

Picket Chip

A picket chip contains a plurality of pickets on a single silicon chip.

Picket Processor system (or Subsystem)

A picket processor is a total system consisting of an array of pickets, a communication network, an I/O system, and a SIMD controller consisting of a microprocessor, a canned routine processor, and a micro-controller that runs the array.
Picket Architecture The Picket Architecture is the preferred embodiment for the SIMD architecture with features that accommodate several diverse kinds of problems including:

set associative processing parallel numerically intensive processing physical array processing similar to images Picket Array A picket array is a collection of pickets arranged in a geometric order, a regular array.
PME or processor memory element PME is used for a processor memory element. We use the term PME to refer to a single processor, memory and I/O capable system element or unit that forms one of our parallel array processors. A processor memory element is a term which encompasses a picket. A processor memory element is 1/nth of a processor array which comprises a processor, its associated memory, control interface, and a portion of an array communication network mechanism. This element can have a processor memory element with a connectivity of a regular array, as in a picket processor, or as part of a subarray, as in the multi-processor memory element node we have described.
Routing Routing is the assignment of a physical path by which a message will reach its destination. Routing assignments have a source or origin and a destination. These elements or addresses have a temporary relationship or affinity. Often, message routing is based upon a key which is obtained by reference to a table of assignments. In a network, a destination is any station or network addressable unit addressed as the destination of information transmitted by a path control address that identifies the link. The destination field identifies the destination with a message header destination code.
SIMD A processor array architecture wherein all processors in the array are commanded from a Single Instruction stream to execute Multiple Data streams located one per processing element.
SIMDMIMD or SIMD/MIMD SIMDMIMD or SIMD/MIMD is a term referring to a machine that has a dual function that can switch from MIMD to SIMD for a period of time to handle some complex instruction, and thus has two modes. The Thinking Machines, Inc. Connection Machine model CM-2 when placed as a front end or back end of a MIMD machine permitted programmers to operate different modes for execution of different parts of a problem, referred to sometimes a dual modes. These machines have existed since Illiac and have employed a bus that interconnects the master CPU with other processors. The master control processor would have the capability of interrupting the processing of other CPUs. The other CPUs could run independent program code. During an interruption, some provision must be made for checkpointing (closing and saving current status of the controlled processors).
SIMIMD SIMIMD is a processor array architecture wherein all processors in the array are commanded from a Single Instruction stream, to execute Multiple Data streams located one per processing element. Within this construct, data dependent operations within each picket that mimic instruction execution are controlled by the SIMD instruction stream.

This is a Single Instruction Stream machine with the ability to sequence Multiple Instruction streams (one per Picket) using the SIMD instruction stream and operate on Multiple Data Streams (one per Picket). SIMIMD can be executed by a processor memory element system.
SISD SISD is an acronym for Single Instruction Single Data.
Swapping Swapping interchanges the data content of a storage area with that of another area of storage.
Synchronous Operation Synchronous operation in a MIMD machine is a mode of operation in which each action is related to an event (usually a clock); it can be a specified event that occurs regularly in a program sequence. An operation is dispatched to a number of PEs who then go off to independently perform the function. Control is not returned to the controller until the operation is completed.

If the request is to an array of functional units, the request is generated by a controller to elements in the array which must complete their operation before control is returned to the controller.
TERAFLOPS TERAFLOPS means $(10)^{**}12$ floating-point instructions per second.
VLSI VLSI is an acronym for very large scale integration (as applied to integrated circuits).
Zipper A zipper is a new function provided. It allows for links to be made from devices which are external to the normal interconnection of an array configuration.

BACKGROUND OF THE INVENTION

In the never ending quest for faster computers, engineers are linking hundreds, and even thousands of low cost microprocessors together in parallel to create super supercomputers that divide in order to conquer complex problems that stump today's machines. Such machines are called massively parallel. We have created a new way to create massively parallel systems. The many improvements which we have made should be considered against the background of many works of others. A summary of the field has been made in other applications which are referenced. See in this connection the related application for our Parallel Associative Processor System, U.S. Ser. No. 601,594 and our Advanced Parallel Array Processor (APAP). System tradeoffs are required to pick the architecture which best suits a particular application but no single solution has been satisfactory. Our ideas make it easier to provide a solution.

This application relates to the above identified co-pending applications and to array processors which can implement SIMD and MIMD operations. In the co-pending applications there are many references to the development of the SIMD processor art and other array processors. The reader may refer to this additional background.

We will discuss various patents relating to SIMD machines which form part of the background in the art but which do not achieve the results we have obtained with our mechanism for grouping pickets in a SIMD/MIMD array in order to execute programs by an array processor.

U.S. Pat. No. 4,783,738 of Li, entitled "Adaptive Instruction Processing by Array Process Having Processor Identification and Data Dependent Status Registers in Each Processing Element", addressed aspects of autonomy whereby the SIMD controller can issue a command to all of the processing elements (PEs) in an array, and each PE can modify/insert a bit in the command as a result of spatial and/or data dependent characteristics. Examples include ADD/SUB, SEND/RECEIVE and a generalization to OPA/OPB. This function would be used in image processing for lines and deals with the boundaries of the image. While this patent has similarities to one of our autonomous functions which can be used in connection with grouping (we cause the ALU to perform an operation that is dependent upon data), we do not specifically focus on changing an operation bit. We do not care that the ALU function is a specific function of location in the array (spatial). Although this patent in the area of data dependent functions is similar to some of our mechanisms, we implement a DWIM (Do what I mean) function where data dependent parts (a sign or condition code, etc.) of an instruction sequence simply force the ALU to do something else. The patent in the area of data dependent autonomous function uses changing/inserting a bit in the operation.

U.S. Pat. No. 4,736,291 of Jennings, entitled "General Purpose Array Processor", discusses an array transform processor that performs high speed processing of arrays of data. It is particularly optimized for performing the FFT (Fast Fourier Transform) algorithm in areas of seismic analysis. The focus of the patent is bulk memory and a system control bus shared by as many as 15 diverse devices. Each device has a writable control store, a program memory, a control unit, and a device dependent unit that provides unique features to each of the 15 devices. While related to an array transform processor, such a processor itself does not necessarily make use of a parallel array of processors, and there is no mention of such in the patent. It will be noted that array transforms can be performed by our systems described in this and related co-pending applications. However, Jenning's processor has instead several subunits (or stages) that process an array of data in a complex repetitive sequential way. This is different from our array of SIMD processors that each take an element of an array of data and process data in the many processors in parallel.

U.S. Pat. No. 4,831,519 of Morton, entitled "Cellular Array Processor with Variable Nest Vector Control by Selective Enabling of Left and Right Neighboring Processor Cells", discusses a SIMD array processor with interprocessor connections to the left and to the right so that the 16 bit processor elements (PEs) can be connected side by side to effectively accommodate various data formats. For example, a 64 bit floating-point word would be handled by successive PEs where the high order PE does the exponent and the other three are ganged together to do the 48 bit fraction. Controls, carry/borrow, could be tied together between the PEs to accomplish this. A chip might contain 16 - 16 bit PEs for data, 2 PEs for address generation, and 2 spare PEs. This patent's I/O uses a 4 level signaling approach to allow combining 2 logic signals onto one pin and generating one of four different voltages depending on the logic condition of the two lines. While the patented device must provide control or controller functions, little is said about that. However, the array is supplied with a global MASK that defines how the PEs are grouped to work on various sizes of data, and local NEST controls that propagate from the master PE of a nest to the slave PEs on the right. There is no appearance of a PE deciding what group it belongs in. Neither is there a sense of local autonomy such that any processing is based on data it is processing other than the NEST controls. This patent describes a possible design for a SIMD chip that can extend horizontally within the chip to handle data widths of 16, 32, and 64 bits by tying together neighboring PEs to operate as a single processor. However, this U.S. Pat. No. 4,831,519 does not discuss how processing elements could be combined. It does not suggest how a chip could handle 16, 32, or 64 bits with neighboring PEs operating as a single processor, or how a processing element could know or decide whether or not it is a participant. This patent has grouping directed by a global control MASK. The lack of local autonomous capability becomes apparent when this patent is reviewed after understanding the present invention.

U.S. Pat. No. 4,783,782 of Morton, entitled "Manufacturing Test Data Storage Apparatus for Dynamically Reconfigurable Cellular Array Processor Chip", discusses chip configuration at manufacturing test to isolate up to two bad PEs in the SIMD array discussed above about U.S. Pat. No. 4,831,519. The chip contains a PROM section where defect data is stored. This can be read by the controller and used in dynamic allocation of on-chip resources. As such, the chip has limited autonomy of a processor.

U.S. Pat. No. 4,748,585 of Chiarulli, entitled "Processor Utilizing Reconfigurable Process to Accommodate Data Word Length", discusses a mechanism for assigning the elements of a parallel processor into segments to accommodate various lengths of data. This is similar to the also referenced U.S. Pat. No. 4,831,519. However, refers to groups of uniprocessors being tied together to get longer wordlength processing. Each uniprocessor is complete in that it has a microsequencer, ALU, registers (REGS), etc. The uniqueness is that several uniprocessors can be lockstepped together to operate on wide data words. Control of the segmentation appears to be accomplished by a global control using combination codes and global condition codes. As a MIMD array, this device cannot provide the capabilities of a SIMD array. The present invention provides improvements relating to the concantenation of pickets, which had not been conceived before, and not to controls for an MIMD array for coupling the arrays together into wider processors, which is the focus of U.S. Pat. No. 4,748,585.

U.S. Pat. No. 4,825,359 of Ohkami, entitled "Data Processing System for Array Computation", discusses a processor for processing arrays of data where the computation might be a Fast Fourier Transform (FFT). The processor contains several processing operators that can each be programmed to do a step in the computation. This could be classed as a complex uniprocessor with several processing operators that operate as a pipeline in executing complex processes. Neither groupings nor autonomy are discussed in this patent, but instead U.S. Pat. No. 4,825,359 appears intended to make some improvements to accommodate a wide field of operators.

U.S. Pat. No. 4,905,143 of Takahashi, entitled "Array Processor and Control Method Thereof", discusses an array processor for executing computations for all combinations of two types of variables and for recursive formulas with local dependency of data using these computation results, which are characterized by matching computations based on dynamic time warping or dynamic programming theory used in case of pattern matching in speech recognition. It would appear that the processor is intended to function as a sort of systolic MIMD table. It appears that PEs are arranged in rings and pass intermediate results to the next PE in the ring. Each PE has its own instruction memory and other features. This patent does not discuss PE autonomy in a SIMD array, and further the PEs appear not to be grouped except by the physical arrangement of the PEs into rings.

U.S. Pat. No. 4,910,665 of Mattheyses, entitled "Distributed Processing System Including Reconfigurable Elements", discusses a two-dimensional SIMD array processor interconnection scheme whereby each PE has direct access to 8 of its neighbors. The communication media is a dotted network that interconnects four neighbors at the corners. Again, while a SIMD machine has been disclosed, there is no thought that local autonomy or groupings of PEs could or should be provided, let alone provided in the manner we will describe.

U.S. Pat. No. 4,925,311 of Neches, entitled "Dynamically Partitionable Parallel Processors", is not related to our implementation of a mechanism for a multi-processor system. In U.S. Pat. No. 4,925,311 the processors within the multi-processor can be assigned to work together on a problem as a group. Furthermore, each processor can add itself to, and remove itself from the group in addition to passing messages, semaphores, and other control between processors. This patent in its MIMD nature has no suggestion which could relate to having local autonomy at the PE in a SIMD array as we describe. Instead, each processor in this multiprocessor system has a network interface controller containing random access memory (RAM), a microprocessor, and some functional unit (the disk controller). Grouping is controlled by the network interface of each processor. We have no need for such elaborate task partitioning, and in our related application discussing grouping, grouping is within each picket.

U.S. Pat. No. 4,943,912 of Aoyama, entitled "Parallel Processing System Having Control Processor and Array Control Apparatus for Selectively Activating Different Processors", discusses a NEWS network connected MIMD array wherein an array controller loads the program into the memory of each PE in the array and then issues a procedure start command to identify to the PEs where they are to begin executing. Each PE contains a register containing task patterns and a comparator for matching the PE's task pattern with a global task pattern command. The result of the comparison is used to select a program start point within the PE, or to cause the PE to go to the idle state. This MIMD patent does not suggest autonomy at the PE in a SIMD array, such as we describe. The comparator and the results it produces could be used to classify or group PEs for different concurrent tasks. We will elaborate how, in a SIMD environment, PEs are allowed to classify or group themselves. The effect is to segregate a portion of our pickets to be active while a section of SIMD code is being executed. Then our machine can proceed to activate another group for processing.

U.S. Pat. No. 4,967,340 of Dawes, entitled "Adaptive Processing System having an Array of Individually Configurable Processing Components", discusses a systolic array processor in which each element consists of two registers, an adder, a multiplier, and three programmable switches. The array is configured by the controller by setting the switches in each stage or element of the array. Then, data is pumped through the stages to create the desired result. Such a processor does not suggest the system we discuss.

U.S. Pat. No. 5,005,120 of Ruetz, entitled "Compensating Time Delay in Filtering Signals of Multi-Dimensional Reconfigurable Array Processors", relates to arrays in the sense that there are multiple processors. However, this patent discusses a time compensation circuit for use in aligning data in a bit-serial signal processor array. Each element of the array consists of four bit-serial registers feeding an ALU. The first register is preceded by the time compensation circuit. This array bears no resemblance to a SIMD machine.

U.S. Pat. No. 5,020,059 of Gorin, entitled "Reconfigurable Signal Processor", relates to a generalized interconnection scheme for use in an array of processors that permits the array to be reconfigured around faulty PEs and to realize tree and other topologies within a basic two dimensional mesh. There is no mention or suggestion relating to array control architecture, grouping, or any aspect of the PEs, thus excluding discussion of autonomy within the PE.

However, in our own case, processing elements or pickets in the array of a SIMD machine have traditionally executed exactly the same operations in every picket. Selective disabling of one or more pickets and allowing local autonomy is a need we recognized and developed. In spite of all the earlier efforts described, there appears to be nothing like the "Parallel Associative Processor System" or the "Dynamic Multi-mode Parallel Array Architecture", referenced above, for performing SIMD, MIMD and SIMIMD processes with one machine. Indeed, the mechanisms needed for the SIMIMD process, floating-point and others have not been adequately developed in the art.

U.S. Pat. No. 5,045,995 of Levinthal, entitled "Selective Operation of Processing Elements in a SIMD Computer System", describes a mechanism for enabling and disabling each of the PEs of a SIMD array based upon data conditions within each PE. A global instruction directs all of the PEs to sample a condition within the PE and to enable or disable itself accordingly via a status register bit. Another global instruction effectively swaps the state of the PEs. These functions can be used to implement IF/THEN/ELSE and WHILE/DO constructs. Additionally, the status can be stacked to support nested enabling conditions. As such, U.S. Pat. No. 5,045,995 relates to the enable/disable functions which we describe. However, as Levinthal's patent requires three conditions:

1. an initial test, load of a status bit, and disable/enable based upon status bit,
2. an instruction that flips all of the disable/enable bits to enable the other set of PEs, and
3. storage to provide for nesting.

It is unnecessarily complicated. It will be seen that we have provided a mechanism that enables and disables functions without tying all of the patent's 1,2,3 conditions together. While our description does not require a flip function, which is described in the patent, we will be seen to have provided more extensive capability for the system than does this patent. The tie of the functions to IF and ELSE instructions and other features which relate to video processing need not be employed in our SIMD machine.

Generally, in accordance with the needs of the art and the technology that we have brought to bear, it will be appreciated that the parallel array processor which we first described in the parent application, entitled "Parallel Associative Processor System", contains many (100's to 1000's) of pickets (PEs). There are many reasons that we would want to group the pickets in some way so that processing could proceed with a selected group or groups of pickets. This selection process can be cumbersome and time consuming, for example, when the array contains more than one diverse job, or not very homogeneous parts of the same job. As an example, one part of a sine/cosine portion of a geometric problem may need to process a SIN(x) while another part of the problem needs to process COS(x). So, the COS group is made inactive while the SIN group computes the SIN; then, the SIN group is made inactive while the COS is processed.

However, a difficulty could arise when one recognizes that a value in the SIN or COS group is the result of an angle that was just calculated. Thus, the assignment to the SIN or COS group needs to be quite dynamic. In addition because the pickets can be in more than one group and could dynamically change their state such that they should be instantly in a different group, it would be more efficient for the pickets to reassign themselves in a dynamic manner.

We have recognized that this reassignment must be done without requiring the array controller either to cause each group reassignment or to know in real time which pickets belong in what groups.

Our invention described in this application provides a mechanism for providing effectively the goal of dynamic autonomous grouping of pickets (PEs).

SUMMARY OF THE INVENTIONS

Particularly, the invention described provides a mechanism for grouping pickets (PEs) in a SIMD/MIMD array. The improvements described provide for grouping of pickets of a SIMD machine during execution of a SIMD or SIMIMD program. While related applications discuss aspects of the preferred embodiments which have been described, the improvements here include the structure for an array processor to assign pickets to groups as an array function conducted in parallel by all active processing elements of an array and mechanisms for using grouping to select certain pickets for a computation that is unique to a group problem.

These improvements are accomplished by providing an array processor with a mechanism for grouping pickets in a SIMD/MIMD array. The array processor has a controller and a plurality of array processing elements capable of functioning in a SIMD mode of operation; each picket includes an arithmetic logic unit, registers, and a local memory, and is intercoupled to other pickets during an operation of the array processor. Each picket can dynamically assign itself to one or more groups of pickets of an array for later individualistic processing of data in the pickets of a group. Every processor element in the processor array receives and executes a command from the controller on each clock cycle, some of which can be interpreted within each picket to create different operations, every processor during such operation being capable of operating in a SIMIMD mode. A unique function within a picket enables that picket to participate in a SIMD instruction stream or to disable that picket from participating in the stream as the result of a SIMD command from the array controller.

The array processor has mechanisms for local autonomy, has a doze mode for preserving the internal state of the picket, and has a doze latch. The doze latch can be changed by the result of computation within a picket. A picket computation that can change the doze latch includes a LOAD, SET, OR RESET instruction per computed data or data read from the picket memory.

In accordance with our invention, the picket status is preserved by not permitting storing to the memory within the picket, and other computations including reading memory and arithmetic calculations within a picket may continue such that only the results that cause an effect are those that are moved into said doze latch.

As a result of the SIMD/MIMD architecture and grouping, array processor groups of array processing elements are enabled to be partitioned according to the type of problem they contain, and each picket has means for enabling it to assign itself to a group or a plurality of groups working on a problem.

We have created a new way to make massively parallel processors and other computer systems by creating a new "chip" and systems designed with our new concepts. This application is directed to such systems. Our here and in the related applications may be viewed of our expression of the various concepts we teach in this application, and in the related applications. Components described in each application can be combined in our systems to make new systems. They also can be combined with existing technology.

We will elaborate in this and related applications Picket Processors and what we call an Advanced Parallel Array Processor (APAP). It may be interesting to note that the picket processor can employ a PME. A picket processor may be especially useful in military application where a very compact array processor is desirable. In this connection, a picket processor differs somewhat from the preferred embodiment associated with the APAP, our Advanced Parallel Array Processor. However, the commonality exists, and aspects and features which we have provided can be employed in differing machines.

The term picket refers to 1/nth element of an array processor made up of processor and memory and their included communication elements applicable for array intercommunication.

The picket concept is also applicable to the 1/nth of an APAP processing array.

While the picket concept can differ from an APAP in data width, memory size, and number of registers, it is, in the massively parallel embodiment which is an alternative to an APAP, different in that it is configured to have connectivity for 1/nth of a regular array, while a PME in an APAP is a part of a sub-array. Both systems can execute SIMIMD. However, because a picket processor is configured as a SIMD machine with MIMD in the PE, it can directly execute SIMIMD, while a MIMD APAP configuration would execute SIMIMD by using MIMD PEs controlled to emulate SIMD. Both machines use a PME.

Both systems can be configured as a parallel array processor, comprising an array processing unit for the array having 'N' elements interconnected with an array communication network wherein 1/Nth of the processor array is a processing element, it's associated memory, a control bus interface, and a portion of the array communication network.

The parallel array processor has a dual operation mode capability wherein the processing unit can be commanded to operate in either or two modes, and freely move between these two modes for SIMD and MIMD operation, where when SIMD is the mode of its organization a processing unit has the ability to command each element to execute it's own instructions in a SIMIMD mode, and where when MIMD is the implementation mode for the processing units organization it has the ability to synchronize selected elements of the array to simulate MIMD execution. We can call this MIMD-SIMD).

A parallel array processor in both systems provides an array communication network with paths for the passing of information between elements of the array. The movement of information can be direction by either of two ways, where as a first way, an array controller directs that all messages move in the same direction at the same time such that the data being moved does not define its destination, and in a second way, each message is self routed with a a header at the beginning of a message defining its destination.

A segment of the parallel array processor array has plural copies of the processing unit is provided on a single semiconductor chip, which each copy segment segment of the array including a portion of the array communication network associated with that segment and buffers, drivers, multiplexers, and control for enabling the segment portion of the array to be seamlessly connected with other segments of the array to extend the array communication network.

The control bus or path from a controller is provided for each processing unit so that the control bus extends to each of the elements of the array and controls its activities.

Each processing element segment of the parallel array, contains plural copies of a processor memory element, which is contained within the limits of a single semiconductor chip, has a segment of the array includes a portion of the array control bus and the register buffers to support the communication of controls to the array segment contained within the chip.

Both can implement mesh moves or routed moves. Normally, the APAP implements a dual interconnect structure, with eight elements on the chip interrelating in one way, while the chips interrelate in another way. The programmable routing on the chip generally causes links to be established between the PMEs as we have described, but the nodes can be and normally are related in another way. On the chip essentially the normal APAP configuration would be a 2×4 mesh, which the node interconnection can be a routed sparse octal N-cube. Both systems have inter-PE intercommunication pathways between PEs (PMEs) enabling a matrix to be made up of point-to-point paths.

With this background and perspective, we will describe in detail features and aspects of our invention related to the preferred embodiment of our invention with reference to the FIGURES. Our detailed description explains the preferred embodiments of our invention, together with advantages and features, with reference to the drawings and related applications.

DESCRIPTION OF THE DRAWING

FIG. 1 shows the control concept for the grouping of pickets from within each picket. A memory location is assigned to each group where the picket sets or resets a bit to indicate participation in the group. This memory location is preferably part of the memory directly associated with an individual processing element which we describe.

DISCUSSION OF GROUPING IN OUR PREFERRED EMBODIMENT

Figure 2:
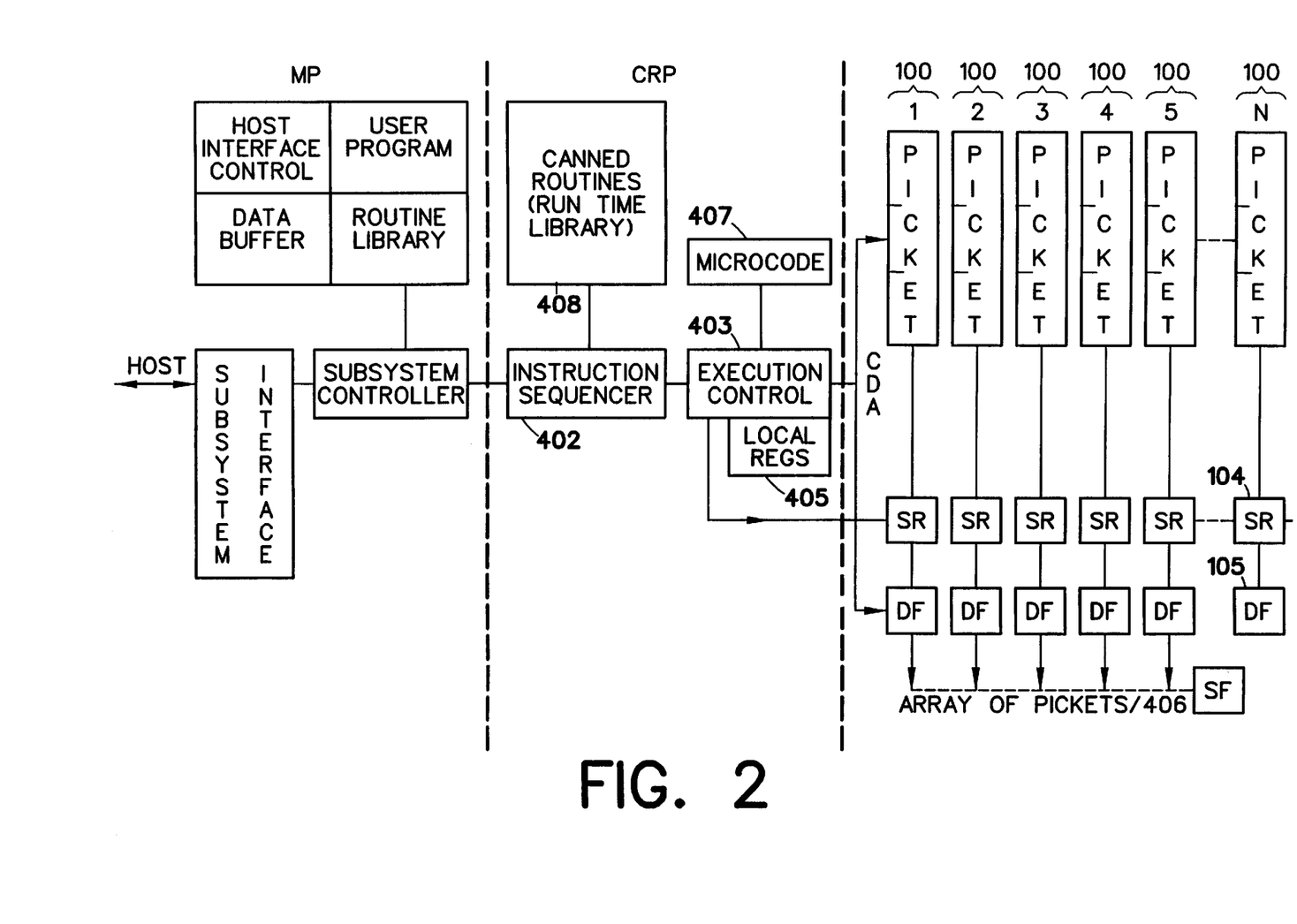
FIG. 2 illustrates a basic 16(n) picket configuration for a SIMD subsystem which employs a microprocessor controller, a hardwired sequencing controller for canned routines, and a picket array which forms the basic parallel picket processor system which may also be a stand along unit.

FIG. 2 illustrates a basic picket configuration of a plurality of parallel processors and memories, picket units, arranged in a row on a single silicon chip as part of a parallel array which may be configured as a SIMD subsystem, illustrating the control structure of such a system. Therein also is illustrated the control processor and the supervisory microprocessor. In FIG. 2, there is illustrated memory and parallel processing element logic on the same chip which within the FIG. 2 are shown in the section labeled Array of Pickets 406. Each memory is n bits wide, preferably a character wide, 8 (9) bits, but conceptually also having a word width of multiple bytes wide memory. Thus, the memory portion of the parallel picket processor element 100 will be preferably 8 (9) bits wide, or alternatively, 16, or 32 bits wide. With current CMOS foundry technology, we prefer to use an 8 bit or character wide associative memory (9 bit wide byte with self checking) with each picket processing element. The memories are directly associated one-on-one with a coupled processing element which includes an ALU, mask registers (A & Q used for masking), and a latch 104 (SR in FIG. 2), as well as status registers and data flow registers 105 (DF in FIG. 2). The DRAM and logic of each picket processor do not have any burden of an interconnection network to contend with, for there is a direct one-on-one association between the multi-bit wide DRAM memory and its processing element on the chip itself.

It will be noted in FIG. 2 that the slide B register latch (SR) 104 is placed logically between the memory and the associated logic of the ALU of the processing element, and the latch becomes in essence a coupling port for each processing element along the picket array. Each picket chip comprises a plurality of parallel picket processing arranged in a line (which is illustrated as a straight bus) for communication with the picket control. A vector address bus is common to the memory, and a data vector address register controls what data passes across to each memory.

FIG. 2 also illustrates the interconnection between the main or microprocessor card MP which in our preferred embodiment is a 386 microprocessor configured as a PS/2 system with a subsystem controller through which global instructions pass to a canned routine processor CRP which we have provided which provides the instructions for an instruction sequencer 402 and execution control 403 which executes the specific microcode called for by the instruction sequencer. This instruction sequencer might be analogized to a controller in function. However, also within the canned routine processor CRP we have provided local registers 405 which together with the local regs ALU (not shown) provide the basis for all addressing that is broadcast to all of the pickets within the picket array 406. In this way, address calculations are performed for all of the pickets in one ALU without using picket resources or conceivably without using picket execution cycles. This important addition adds control flexibily to the picket array, permitting doze, inhibit, and other control functions for specialized tasks to be performed and permitting pickets to be separated from any broadcast instruction or data function.

The instruction sequencer 402 with the loaded microcode 407 broadcasts to the array of pickets for execution under the SIMD instruction sequence determined by the main program microprocessor MP and by the canned routines of the canned routine processor CRP run time library 408 to enable SIMD processing of data contained in the array of pickets.

Figure 1:
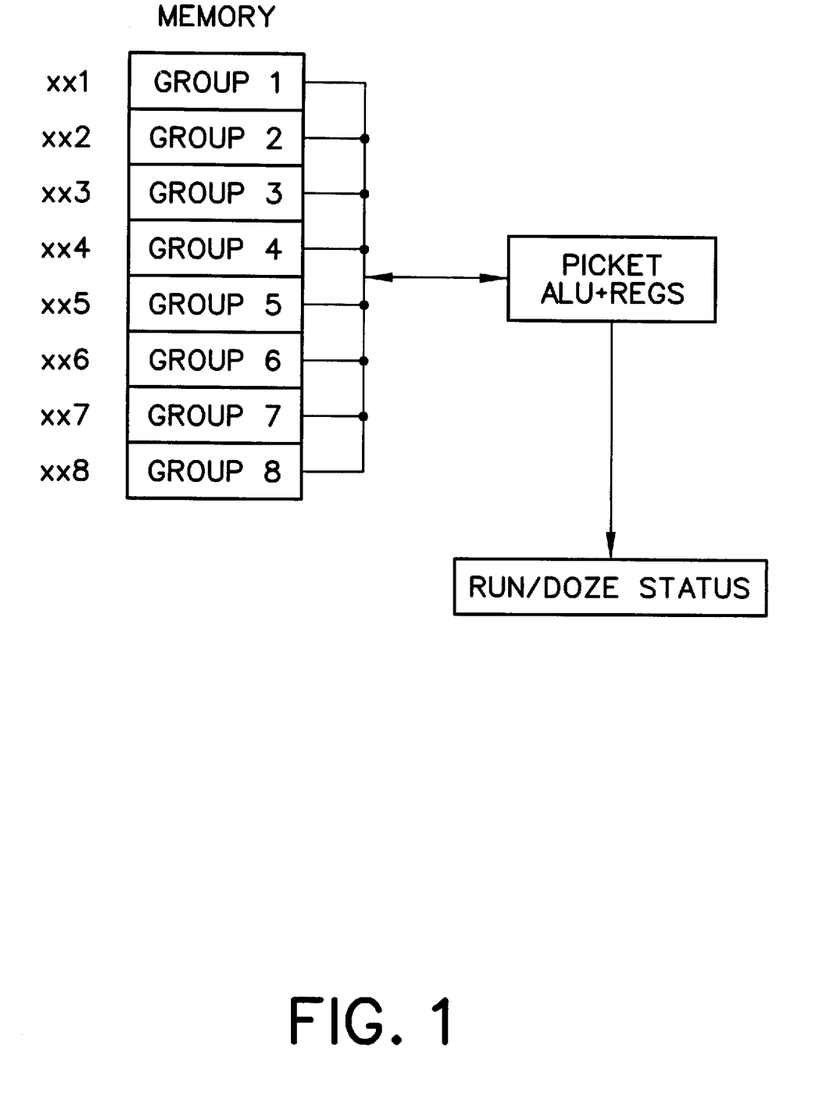

Our improvements for grouping of pickets of a SIMD machine during execution of a SIMD or SIMIMD program will be described with respect to FIG. 1. FIG. 1 represents a replicatable set of elements of an array processor, generally referred to as a PE which includes a processing element (ALU+REGs), and a memory, with some means to interconnect out of the replicatable element(s) to other replicatable elements of the array. The replicatable elements are in a SIMD mode controlled by a controller. The controller controls the functions of the set of replicatable elements making up the array. The replicatable element is a node of the array. In some systems the node will be a group of chips. In our preferred embodiment the node may be considered by some a set of picket elements as described in the "Parallel Associative Processor System" application above. It can be employed on the chip of the "Advanced Parallel Array Processor" filed concurrently herewith. There each picket, like the parent application, is one of a set of processing elements which are on a single chip and which are capable of common control in the SIMD mode, but which also can function in MIMD mode. In less advanced systems, the number of processors which make up the set may be made of individual processor elements (ALU, REGS, MEMORY, I/O) either incorporated one to a chip with external communications, or even replicated as separate chip elements. Our grouping concepts have particular advantages, especially when they are employed where there are a set of processing elements on a chip. In this connection, we would refer to the related applications, and to the "Advanced Parallel Array Processor" application which incorporates our inventions. Our inventions can be employed in massively parallel array processors.

While other applications discuss aspects of the preferred embodiments which have been described, the improvements here include the structure for an array processor to assign pickets to groups as an array function conducted in parallel by all active processing elements of an array and mechanisms for using grouping to select certain pickets for a computation that is unique to a group problem. FIG. 1 shows the control concept for the grouping of pickets from within each picket. A memory location is assigned to each group where the picket sets or resets a bit to indicate participation in the group. Within each picket a memory location is assigned to each group where the picket sets or resets a bit to indicate participation in the group. This memory location is preferably part of the memory directly associated with an individual processing element which we describe. It preferably forms part of the replicatable processing element itself, but in those systems which employ shared memory, part of which is assigned as local memory, and part of which is assigned as global memory, it is the local associated memory portion. First of all, a group consists of all of the pickets that have something specific in common. There are a lot of reasons that we would want to group the pickets in some way. One example is the case where the array contains more than one diverse job, or not very homogeneous parts of the same job.

Pickets can assign themselves into one or more of several groups, and processing can proceed based on these groupings. The more pickets, that are computing at one time, the better, but some operations require working with a subset group of the pickets. Local participation autonomy is the tool that makes this work, and we have described those mechanisms.

We now address the interesting way that the pickets can put themselves into groups without requiring that the array controller know which pickets are in which groups.

A SIMD machine, even with a high degree of local autonomy, needs to work on one set of homogeneous problems at a time. Non-participating parts of the array are placed in a passive state (doze) while the active part of the array is working on a problem. In doze mode, a picket's activity is restricted such that the problem and data that reside in the picket are not disturbed. The picket in doze mode still reads memory and does most operations that other pickets do with the exception that it does not store into memory or registers with the further exception that we can store into the doze bit in the status word. Thus, a picket can compute a new status and load the doze bit to reactivate it (wake it up).

An important feature of our grouping is that each picket makes the decision as to whether it is in a group, or indeed, in several groups. So, the assignment and reassignment process is a parallel operation that many pickets perform in parallel. The controller does not even need to know which pickets are in which groups. It can, however, read the status from each picket should the controller need this information. Thus, in FIG. 1, this controller function is located in the controller function represented by the Run/Doze Status block register associated with each picket. The block can be located in the picket itself, and read by the controller.

To establish separate groups, a memory location is reserved in the picket for each group. Location xx1 in all pickets contains the doze control bit for group 1 as shown in FIG. 1. The calculated value that would be loaded into the doze bit is first stored into the appropriate group location in each picket's memory. Then, the value is put into the doze bit to possibly cause the picket's status to change. In accordance with our invention, several groups can be identified and set up ahead of individualized processing by loading their group locations with appropriate binary one/zero patterns. The identification of a group might be done by looking at the carry out and/or the zero condition of an operation and loading a group with the value. Some ways to establish groups are:

Make a group of all those pickets with a carry out of 1;

Make a Group that has the content of selected memory being positive; and,

Make a Group that has the content of selected memory that is equal to a specified broadcast value.

Now location xx2 in each picket contains a logical 1 if the picket is in group 2, and a logical 0 if the picket is not in group 2. There are three commands to change the doze bit. It can be LOADed, SET, or RESET.

LOAD DOZE will change the active group to the group containing the pickets whose memory at loc (e.g.) xx3 contains logical 1s. Those pickets that were on before but whose mem loc (xx3) contains logical 0s will be turned off.

SET DOZE will add to the active group all of the pickets whose memory at loc (e.g. xx4) contain logical 1s. No pickets will be turned off.

RESET doze will remove fron the active group all of the pickets whose memory at loc (e.g. xx4) contain logical 1s. No pickets will be turned on.

By using the Load, Set(AND), and Reset(OR), we can effectively use the logic functions to create new groups from the logical relationships of existing groups. A new group can also be created by logically merging existing groups in the picket data flow using theory of sets.

Up to this point, the controller of the SIMD array is aware of groups because it has been processing with them and changing active processing from group to group. But, the controller is not at all aware of which pickets are in which groups, or if indeed the group is empty (no pickets in it.)

This information on individual pickets can be read by the controller if necessary by using other functions. The result of these functions is to give the address of the picket of interest. Here are three examples:

Find the picket in the group with the newest value;

Find the picket in the group with the smallest address; and,

Find the picket in the group whose values most closely match these values.

In each of these cases, the SIMD controller must run through a sequence of instructions that isolate the picket with the desired value. Various across-picket instructions participate in isolating the desired picket. At this point, the desired picket is the only one still awake. The controller can request its address and can read out or load data to the single picket's memory.

It will be appreciated that the grouping function of the array processor becomes a powerful tool, not only in SIMD but in other modes such as SIMIMD.

We have described our invention in various aspects. It can be used with our related inventions or in other environments. It is particularly of interest to us in PE nets which are located on a chip. However, as our invention has been explained, it will occur to those skilled in the art, both now and in the future, that various modifications and rearrangements can be made. Such changes are within the scope of the appended claims which are to be construed to protect the rights of the first inventors.

What is claimed is:

1. An array processor comprising, an array controller and a plurality of array processing elements functioning in a SIMD mode of operation; each of said array processing elements comprising a Picket (PE) including an arithmetic processing element, registers, local memory, and interconnection to other processing elements of the array, each of said Pickets being intercoupled during an operation of the array processor, and each processing element having means for dynamically assigning and reassigning itself to one or more of a plurality of processing groups of Pickets of an array for processing of data in the Pickets of a group and wherein the array controller does not maintain in real-time which Pickets belong in which of said plurality of processing groups;

wherein every processing element in the processor array receives and executes a command from the controller on each clock cycle;

wherein a memory is provided in each Picket having a memory element corresponding to each group, the status of the memory element indicating participation of a particular Picket in the group; and wherein said array processor provides a multi-processor memory system, including a PME architecture multi-processor memory element on a single semiconductor substrate which functions as a system node, said multi-processor memory element including the plurality of Pickets, means on said substrate for distributing interconnection and controls within the multi-processor memory system node enabling the system to perform SIMD/MIMD functions as a multi-processor memory system, wherein each said local memory is independently accessible by the respectively coupled processing element in both SIMD and MIMD modes exclusive of access by another processing element.

2. An array processor according to claim 1 where every processing element in the processor array receives and executes a command from the controller on each clock cycle, some which can be interpreted within each Picket to create different operations, and every processing element during such operation operating in a SIMIMD mode.

3. An array processor according to claim 2 wherein a unique function within a picket enables that picket to participate in a SIMD instruction stream or disables that picket from participating in the stream as the result of a SIMD command from the array controller.

4. An array processor according to claim 3 wherein the array processor has doze mode means for preserving the internal state of a Picket and said doze mode means includes a doze latch in the Picket.

5. An array processor according to claim 4 wherein a processing element doze latch is changed by the result of computation within a Picket.

6. An array processor according to claim 4 wherein Picket status is preserved by not permitting storing to the memory within the Picket, and allowing other operations including reading memory and arithmetic calculations within a Picket to continue, such that only the results of calculations that cause an effect on Picket status are loaded into said a doze latch.

7. An array processor according to claim 3 wherein each picket of the processor has doze mode means for preserving the internal state of a picket, and a doze latch.

8. An array processor according to claim 7 wherein a Picket computation that can change the doze latch includes a LOAD, SET, OR RESET instruction.

9. An array processor according to claim 1 wherein within said array processor groups of array processing elements are enabled to be partitioned according to the type of problem they contain, and each picket has means for enabling it to assign itself to a group, or a plurality of groups working on a problem.

10. An array processor according to claim 1 further including means for assigning pickets to groups as an array function conducted in parallel by all active processing elements of an array, and means for using grouping to select certain pickets for a computation that is unique to a group problem.

11. A processing element in an array processor having a controller and a plurality of array processing elements functioning in a SIMD mode of operation; the processing element comprising an arithmetic processing element, registers, local memory, and interconnection to other elements of the array, said processing element having I/O capability for being intercoupled to other processing elements in an array having groups of processing elements during an operation of said array processor, and said processing element having means for dynamically assigning itself to one or more of a plurality of processing groups of processing elements of an array for processing of data in the processing elements of a group;

wherein every processing element in the processor array receives and executes a command from the controller on each clock cycle; and wherein a memory is provided having a memory element corresponding to each group, the status of the memory element indicating participation of a particular Picket in the group;

wherein said array processor provides a multi-processor memory system, including a PME architecture multi-processor memory element on a single semiconductor substrate which functions as a system node, said multi-processor memory element including the plurality of processing elements, and means on said substrate for distributing interconnection and controls within the multi-processor memory system node enabling the system to perform SIMD/MIMD functions as a multi-processor memory system, wherein each said local memory is independently accessible by the respectively coupled processing element in both SIMD and MIMD modes exclusive of access by another processing element; and wherein each processing element of the processor has doze mode means for preserving the internal state of the processing element and a doze latch and wherein processing element status is preserved by not permitting storing to the memory within the processing element, and other computations including reading memory and arithmetic calculations within a processing element may continue, such that only the results that cause an effect are those that are moved into said doze latch.

12. A processing element according to claim 11 where said processing element is coupled to other processing elements in an array processor and the processor array has a controller, and said processing element receives and executes a command from the controller on each clock cycle, some which can be interpreted within each processing element to create different operations, and every processing element during such operation operating in a SIMIMD mode.

13. A processing element according to claim 12 wherein a unique function within a processing element enables that processing element to participate in an array processor SIMD instruction stream or disables that processing element from participating in the stream as the result of a SIMD command from a controller of the array.

14. A processing element according to claim 13 wherein the array processor has doze mode means for preserving the internal state of a processing element, and a doze latch.

15. A processing element according to claim 12 wherein within said array processor has groups of coupled processing elements which are enabled to be partitioned according to the type of problem they contain, and each processing element has means for enabling it to assign itself to a group, or a plurality of groups working on a problem.

16. A processing element according to claim 11 wherein said doze latch can be changed by the result of computation within a processing element of an array of processing elements of an array processor, including said processor element.

17. A processing element according to claim 16 wherein a processing element computation that can change the doze latch includes a LOAD, SET, OR RESET instruction.

18. A processing element according to claim 11 further including means for assigning said processing element to groups of processing elements in an array as an array function conducted in parallel by all active processing elements of an array, and means for using grouping to select certain processing elements for a computation that is unique to a group problem.

19. A massively parallel processor comprising, an array processor having a plurality of processing elements arranged in an array, an array controller for controlling said array of processing elements, means for providing each processing element with controls for dynamically assigning and reassigning itself at a processing point to one or more of a plurality of processing groups of Pickets of an array for processing of data in the processing element of a group and wherein the array controller does not maintain in real-time which Pickets belong in which of said plurality of processing groups;

wherein every processing element in the processor array receives and executes a command from the controller on each clock cycle;

wherein a memory is provided in each Picket having a memory element corresponding to each group, the status of the memory element indicating participation of a particular Picket in the group; and wherein said massively parallel processor provides a multi-processor memory system including a PME architecture multi-processor memory element on a single semiconductor substrate which functions as a system node, said multi-processor memory element including the plurality of processing memory elements, each of said processing memory elements having a processor coupled with a dedicated local memory, and means on said substrate for distributing interconnection and controls within the multi-processor memory system node enabling the system to perform SIMD/MIMD functions as a multi-processor memory system, wherein each dedicated local memory is independently accessible by the respectively coupled processor in both SIMD and MIMD modes exclusive of access by another processor.

20. A massively parallel processor according to claim 19 further including means for causing every processing element in a processor array to receive and execute a command from the array controller at a controller specified event, at a designated clock cycle or during each clock cycle, some of commands which can be interpreted within each processor element to create different operations.

21. A massively parallel processor according to claim 19 further providing means for causing processors during a group operation to operate in a SIMIMD mode.

22. A massively parallel processor according to claim 19 further providing means for causing processors during a group operation to execute a function within a processing element for enabling participation in a SIMD instruction stream or for disabling the processing element from participating in the instruction stream as the result of an external SIMD control command.

23. A massively parallel processor according to claim 19 further providing means for causing local processing element autonomy for independence from a SIMD operation.

24. A massively parallel processor according to claim 19 including local autonomy means for causing independence of operation from a program group control command having a doze mode for preserving the internal state of the picket, and a doze latch.

25. A massively parallel processor according to claim 19 further providing a doze latch for processing elements of said array which can be changed by the result of computation within a processing element.

26. A massively parallel processor according to claim 19 further providing a control means for a processing element computation that can change a participation mode of a processing element, including a LOAD, SET, OR RESET instruction.

* * * * *